United States Patent
Comay (10) Patent No.: US 8,660,294 B2
(45) Date of Patent: Feb. 25, 2014

(54) FORM DATA EXTRACTION WITHOUT CUSTOMIZATION

(75) Inventor: Ofer Comay, Gan Haim (IL)

(73) Assignee: Charactell Ltd., Tel Aviv (IL)

( * ) Notice: Subject to any disclaimer, the term of this patent is extended or adjusted under 35 U.S.C. 154(b) by 1245 days.

(21) Appl. No.: 12/091,106

(22) PCT Filed: Sep. 27, 2006

(86) PCT No.: PCT/IL2006/001135
§ 371 (c)(1),
(2), (4) Date: Apr. 22, 2008

(87) PCT Pub. No.: WO2007/049270
PCT Pub. Date: May 3, 2007

(65) Prior Publication Data
US 2008/0285792 A1    Nov. 20, 2008

Related U.S. Application Data

(60) Provisional application No. 60/729,532, filed on Oct. 25, 2005.

(51) Int. Cl.
G06K 9/00 (2006.01)
G06K 9/20 (2006.01)
G06K 9/62 (2006.01)
G06F 17/24 (2006.01)

(52) U.S. Cl.
CPC ............ *G06F 17/243* (2013.01); *G06F 17/248* (2013.01); *G06K 9/2081* (2013.01)
USPC ............................ 382/100; 382/321; 382/217

(58) Field of Classification Search
None
See application file for complete search history.

(56) References Cited

U.S. PATENT DOCUMENTS

| | | | |
|---|---|---|---|
| 5,048,099 A * | 9/1991 | Lee | 382/175 |
| 5,404,294 A * | 4/1995 | Karnik | 715/236 |
| 5,416,849 A | 5/1995 | Huang | |
| 5,737,442 A | 4/1998 | Alam | |
| 5,793,887 A | 8/1998 | Zlotnick | |
| 5,903,667 A * | 5/1999 | Kuzunuki et al. | 382/187 |
| 6,456,740 B1 * | 9/2002 | Carini et al. | 382/187 |
| 6,640,009 B2 | 10/2003 | Zlotnick | |
| 6,683,697 B1 * | 1/2004 | Lech et al. | 358/1.15 |
| 6,886,136 B1 | 4/2005 | Zlotnick | |

(Continued)

FOREIGN PATENT DOCUMENTS

| WO | WO 2005/029392 A1 | 3/2005 |
|---|---|---|
| WO | WO 2005/043452 A1 | 5/2005 |

OTHER PUBLICATIONS

Quick Reference Guide of the software EzDataTM, 2003.*

(Continued)

*Primary Examiner* — Li Liu (74) *Attorney, Agent, or Firm* — Pearl Cohen Zedek Latzer Baratz LLP (57) ABSTRACT

A form processing method for extracting data items from a form previously digitized in the form of a digital image, the method comprising prompting a user to indicate a location of one or more physical fields each physical field relating to a data item of specific type; receiving one or more indications provided by the user on the location of the physical fields; and identifying content and location of the data items of the physical fields using related data formats.

14 Claims, 4 Drawing Sheets

(56) References Cited

U.S. PATENT DOCUMENTS

| | | | |
|---|---|---|---|
| 7,328,847 B1* | 2/2008 | Shen et al. | 235/462.01 |
| 7,627,592 B2* | 12/2009 | Crockett et al. | 1/1 |
| 2002/0044688 A1* | 4/2002 | Naoi et al. | 382/190 |
| 2002/0067854 A1* | 6/2002 | Reintjes et al. | 382/199 |
| 2002/0103827 A1* | 8/2002 | Sesek | 707/505 |
| 2002/0107885 A1* | 8/2002 | Brooks et al. | 707/505 |
| 2002/0194222 A1* | 12/2002 | Kaply et al. | 707/513 |
| 2003/0084402 A1 | 5/2003 | Treibach-Heck et al. | |
| 2003/0214681 A1* | 11/2003 | Bohan | 358/468 |
| 2004/0064787 A1* | 4/2004 | Braun et al. | 715/505 |
| 2005/0058347 A1 | 3/2005 | Lapstun et al. | |
| 2005/0179943 A1 | 8/2005 | Silverbrook et al. | |
| 2005/0185218 A1* | 8/2005 | Lech et al. | 358/1.15 |
| 2005/0198563 A1* | 9/2005 | Kristjansson | 715/507 |
| 2006/0007189 A1* | 1/2006 | Gaines et al. | 345/179 |

OTHER PUBLICATIONS

Suzanne Liebowitz Taylor, Richard Fritzson and Jon A. Pastor, "Extraction of data from preprinted forms", Machine Vision and Applications, 1992, vol. 5, No. 3, 211-222.*

International Search Report From International Application No. PCT/IL/06/01135 Date of Mailing: Oct. 27, 2008.

Extended European Search Report of Application No. 06796132.6, mailed on Jan. 25, 2013.

* cited by examiner

| Quantity | Description | Unit Price | Amount |
|---|---|---|---|
| 1.00 | Services | 200.00 | 200.00 |
| 1.00 | Books | 260.00 | 260.00 |
| | | | |
| | | | |
| | | | |

Colantuoni Bros. Equipment Corp.

Invoice

| Date | Inv no: |
|------|---------|
| 1/7/04 | 7726 |

Bill to:

Type here Vendor Name
Colantuoni Bros. Equipment Corp.

Type here Invoice Number
7726

Type here Invoice Date
1/7/2004

Figure 7

FORM DATA EXTRACTION WITHOUT CUSTOMIZATION

CROSS-REFERENCE TO RELATED APPLICATIONS

This application is a National Phase Application of PCT International Application Number PCT/IL2006/001135, filed Sep. 27 2006, entitled "Form Data Extraction Without Customization", Published on May 3, 2007 as International Publication Number WO 2007/049270, which claims priority of United States Provisional patent application No. 60/729,532, entitled "Form Data Extraction Without Customization",filed on Oct. 25 2005,both of which are incorporated herein by reference in their entirety.

FIELD OF THE INVENTION

The present invention relates to form processing. More particularly it relates to form processing with data extraction without customization.

BACKGROUND OF THE INVENTION

In the regular course of business, nearly all organizations receive forms containing data (such as bills/invoices, purchase orders, claims, etc.) whose content must be captured and transferred into Target Applications. Such Target Applications may perform one or more specific tasks, or store the data in databases. Known programs for processing forms (FPA—Form Processing Applications or FPP—Form Processing Programs) usually apply OCR (Optical Character Recognition) techniques to scanned images of forms in order to save data typing. However, in most cases, these products require a significant amount of customization work so they can be applied.

There are two types of customization work that are built-in in existing software products.

Since it is common to have to process forms that have a large number of different Layouts—possibly hundreds or even thousands—form-processing programs require prior knowledge of the physical Layout of these forms. Collecting sample forms and preparing the prior knowledge in a useful way for use with the form-processing program is typically a tedious and expensive task.

Linking the form processing program and the Target Application also requires a significant amount of work. For example, the data captured by the form processing system should be transferred to the Target Application and validated against existing data within the Target Application.

The present invention is aimed at simplifying the process of capturing data from scanned images of forms, and transferring the data to Target Applications yet virtually eliminating the two types of customization work listed above.

Several existing form-processing programs extract data from scanned images of forms using OCR technology, and send the data into Target Application data files. Some examples of FPPs are: FormWare™ from Captiva Software Corporation, FormReader™ from ABBYY Software House, and OCR for AnyDOC™ from AnyDoc Software Corporation.

These, and other such programs, typically operate in two main modes:

Setup Mode—in which the user defines a Template for each form Layout. In most of the existing form processing products this is done by drawing rectangle regions on the image of the scanned form, and defining OCR instructions for each region. This collection of regions and instructions is saved as a Template for each form Layout.

Run Mode—forms containing data are scanned and automatically matched to a Template using a Template Matching Algorithm, then, for each pre-defined region, a standard OCR program extracts data from it. A subsequent step in Run Mode is when a human operator verifies and corrects the OCR results. The final step in Run-Mode is to send the verified data to the Target Application by creating files that the Target Application can process at a later time.

Even when the form is known, like invoices or orders, the Setup mode is user-specific because each user needs to process different form Layouts. The amount of work during this mode is proportional to the number of form Layouts encountered. The integration of the final Run Mode step into a Target Application is specific to that application, as each Target Application requires different customization.

It is a purpose of the present invention to provide system and method for form processing which allows data extraction and posting without the need for initial customization for each end user.

Other objects and advantages of the present invention will become apparent after reading the present specification and considering the accompanying figures.

SUMMARY OF THE INVENTION

There is thus provided, in accordance with some preferred embodiments of the present invention, a form processing method for extracting data items from a form previously digitized in the form of a digital image, the method comprising:

prompting a user to indicate a location of one or more physical fields each physical field relating to a data item of specific type;

receiving one or more indications provided by the user regarding the location of the physical fields;

identifying content of the data items of the physical fields using related data formats.

Furthermore, in accordance with some preferred embodiments of the present invention, the method further comprises:

identifying the locations of said one or more physical fields;

using the locations of said one or more physical fields establishing a template comprising instructions where to find data items of same specific type on forms with a similar layout.

Furthermore, in accordance with some preferred embodiments of the present invention, the method further comprises:

matching another digital image of another form with the template; and upon determining a match automatically extracting data items using the template instructions.

Furthermore, in accordance with some preferred embodiments of the present invention, the indication provided by the user on the location of the physical field comprises a single click by a pointing device on or in the vicinity of the data item in the image.

Furthermore, in accordance with some preferred embodiments of the present invention, the indication provided by the user on the location of the physical field comprises touching a touch screen on which the image is displayed on or in the vicinity of the data item in the image.

Furthermore, in accordance with some preferred embodiments of the present invention, the method further comprises transferring the data item to a target application.

Furthermore, in accordance with some preferred embodiments of the present invention, said one or more physical fields are arranged in a table form.

Furthermore, in accordance with some preferred embodiments of the present invention, the step of receiving one or more indications comprises receiving indications on the location of items on a first row of the table, the method further comprising automatically extracting data items located in columns below the indicated items of the first row of the table.

Furthermore, in accordance with some preferred embodiments of the present invention, the method further comprises:

using the locations of the data items of the first row of the table establishing a template comprising instructions where to find data items of same specific type in columns of the table in forms with a similar layout.

Furthermore, in accordance with some preferred embodiments of the present invention, the method further comprises:

matching another digital image of another form with the template; and upon determining a match automatically extracting data items from the table using the template instructions.

Furthermore, in accordance with some preferred embodiments of the present invention, there is thus provided a form processing system for extracting data items from a form, the system comprising:

a scanner for scanning the form into a digital image;

a display device for displaying the digital image;

a pointing device; a processing unit for prompting a user to indicate a location of one or more physical fields each physical field relating to a data item of specific type, for receiving one or more indications provided by the user using the pointing device on the location of the physical fields on the image displayed on the display device, and identifying content and location of the data items of the physical fields using related data formats.

Furthermore, in accordance with some preferred embodiments of the present invention, the display device and the pointing device are integrated in a touch screen display device.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

The present invention is aimed at providing method and system for form processing facilitating extraction of data from the form without having to perform initial customization, as is the case with prior art form processing methods and applications.

The present invention introduces a new method that eliminates the need for customization, and offers commercial off-the-shelf (COTS) products for extracting form data to be transferred into Target Applications.

User specific customization work that is usually required during the Setup Mode of existing products is not needed in the case of the present invention because the Templates are created automatically as the user performs routine work.

The customization work required by existing form-processing programs in order to meet customer needs is tedious, lengthy, and expensive. By applying the method of the present invention software developers can develop an On-the-Shelf form-processing program that can read forms and send the data into Target Applications.

The present invention discloses a method of processing an electronic image of a physical form that was previously digitized by a scanner or other digitizing means, and preparing the data to be delivered to a Target Application. A possible set of logical forms is a-priori known to the process.

It is useful to define and explain the terminology used throughout the present specification in the context of the present invention. Throughout the present specification the term "Logical Form" (examples of Logical Forms: Invoice, Order) refers to a set of Logical Fields that define data items included in the form that needs extraction (example of Logical Fields: Invoice Number, Invoice Date). Each "Logical Field" contains instructions on the extraction of data that should be extracted from the physical form, which is the image of a scanned form. Physical forms of different organizations may have different "Layouts" and contain the same data in different locations on the physical form (and its image).

Throughout the present specification the term "Template" refers to a set of instructions for a Template Matching Algorithm (see below) and also regarding the location of the physical fields within the physical form. Normally, there are many physical forms associated with one Template because the location of the fields in the form can be obtained using the same Template instructions for all of them (Example: when one vendor sends two bills, in most of the cases the bills have the same Layout, and therefore the same Template instructions can be used to the two bills). Each Logical Form may have several possible Templates associated with it (Example: the Logical Form "Bill" may have several Templates if there are several vendors that send invoices, since in most cases different vendors produce invoices with different Layouts). In most of the cases, different form Layouts should have different Templates.

In the context of the present specification the term "Field Region" refers to a set of instructions regarding how to locate the physical field out of the physical form. Field Region is part of the Template. Sometimes the Field Region contains only the coordinates of the region, but sometimes it contains other instructions to find the location of the physical field by identifying other indicative marks on the physical form.

Example 1: the instruction is to find the content of the data in the exact coordinates after the form is "registered", meaning that the form is moved and deskewed to fit the template; Example 2: the instruction can be: find the Total Field to the right of the printed word "Total" on the physical form.

Reference is now made to the figures.

Figure 1:
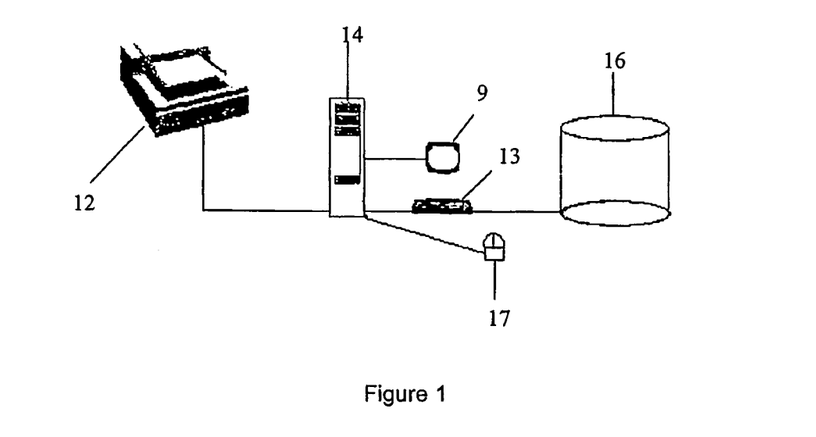
FIG. 1 illustrates a form processing system according to a preferred embodiment of the present invention.

FIG. 1 illustrates a form processing system (designated the numeral 10) for data extraction from a form, according to a preferred embodiment of the present invention. A scanner 12 is provided for scanning the forms the data of which is to be transferred to a Target Application. The scanned image of the form is transferred to a computing unit 14, provided with a display device 9, user interface (for example keyboard 13) and a pointing device (for example mouse 17). A digital image of the form is displayed on the display device and the user is prompted to indicate on the displayed image the location of various data items of specific type. The computing unit performs the data extraction method of the present invention (see detailed explanation hereinafter) and using OCR software, extracting the data from the image. The user operating the computing unit validates the OCR results and corrects it if necessary. The final data may be stored on a database 16 to be used by a Target Application or for future reference.

Figure 2:
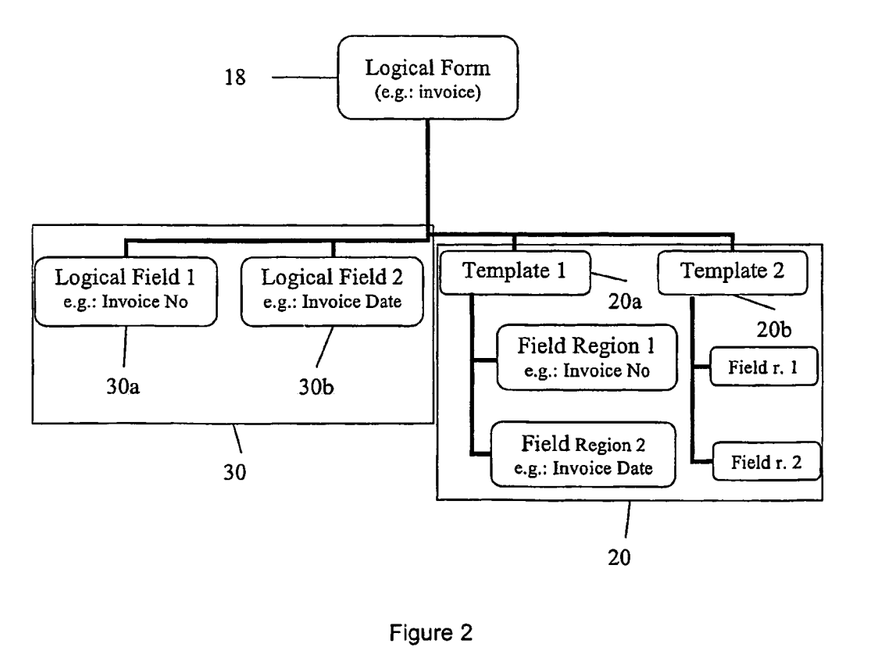
FIG. 2 illustrates the hierarchy of a Logical Form, Logical Fields, Templates, and Field Regions, according to a preferred embodiment of the present invention.

FIG. 2 illustrates the hierarchy of a Logical Form, Template, Field Regions and Logical Field according to a preferred embodiment of the present invention.

For each Logical Form 18 there may be several linked Templates (the drawing shows two templates 20a and 20b for brevity, but the number of Templates changes depending on the number of different form Layouts to be processed). A "Template List" (20) is the set of Templates that are linked to a Logical Form 18. A "Logical Form" 18 refers to the data items 30 that are of interest and that are sought for by the form processing user (typically to be transferred to Target Application). Each data item is referred to as "Logical Field" (30a, 30b).

Figure 3:
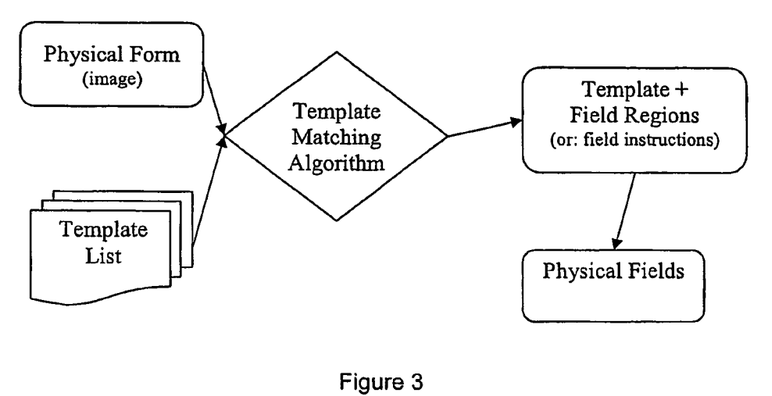
FIG. 3 illustrates Template Matching Algorithm that finds a template and then find the physical fields.

A "Template Matching Algorithm" 40 (see FIG. 3) decides whether a physical form 19 (that is the scanned image of the form) matches a Template (say 20a) from a Template List (20), and then locates the physical fields 21 in the physical form. Template Matching Algorithms are not new and products that use such algorithms exist today, such as FormOut™ from Top Image Systems Ltd, or the form recognition option in Nestor Reader™ from NCS. Another example for such algorithm is disclosed in U.S. Pat. No. 6,886,136. See also U.S. Pat. Nos. 5,793,887 or 6,640,009.

Figure 4:
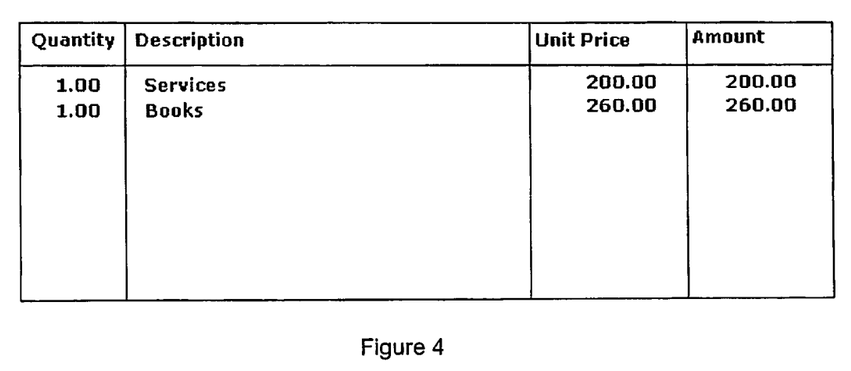
FIG. 4 illustrates a typical table with several columns in a printed form.

Some forms have data that is stored in tables. An example is the list of items in an invoice. Each line in the table is associated with one item. The table fields are stored in columns: item description, quantity, price and amount are stored in different columns in the table. See illustration in FIG. 4.

"Table Extraction": when the location of each physical field in the first line of the table is known, it is possible to extract the data from the entire table using a simple algorithm such as the following:

1. A full page standard OCR program extracts the Text, and the location of each word of the Text in terms of X,Y coordinates, from the entire image.
2. For every physical field in the first line, the algorithm searches for physical field in the next line, such that it has the same X coordinate or nearly the same X coordinate as the physical field in the previous line. The X coordinate may be applied to the left side of the physical field, the right side of the physical field, or the center of the physical field.
3. If the algorithm finds physical fields in the next lines for every physical field in the previous line, then the algorithm continues to search for the next table line. The algorithm stops searching when one or more physical fields do not have physical fields in the next line with similar X coordinate.
4. Additional step can be to search for the entire physical field according to the field type. This can be done like the algorithm in paragraph A5.3 below.

There are other methods to make Table Extraction, e.g.: U.S. Pat. No. 5,737,442.

A "Target Application" is an application that receives the data that is extracted from the forms. Examples of Target Application are ClaimGear of XGear Technologies, Microsoft Small Business Accounting™ from Microsoft® or QuickBooks from Intuit.

The process starts with an empty Template List or a list that contains a pre-defined set of Templates. The pre-defined Templates can be used for Templates of forms that are widely used. For example, a Template relating to a bill from a courier company (e.g., Federal Express, UPS) may be a part of the pre-defined Templates.

The process uses the following steps to read a physical form into a Target Application:

A1: Compare a physical form image to a list of pre-defined Templates using a Template Matching Algorithm. As described hereinabove such an algorithm exists in many existing Form Processing applications.

A2: If the comparison succeeds go to step B1 (see hereinafter).

Figure 5:
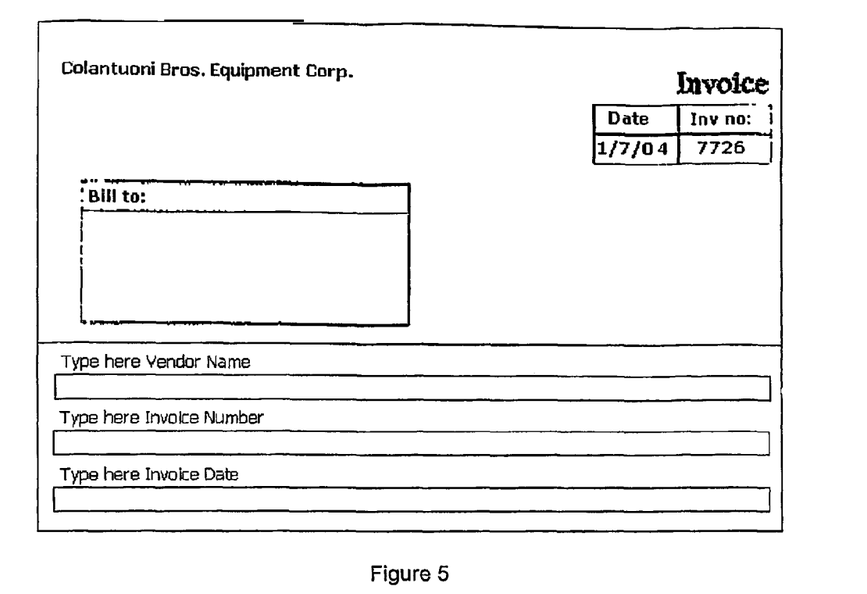
FIG. 5 illustrates a step of indicating fields on a form, asking the user to click on the Vendor data on the image, according to a preferred embodiment of the present invention.

The following steps are applied to process a physical form with a new form Layout (when the above mentioned comparison fails):

A3: Display the image and ask the user to click on it at the location of the field (e.g.: Vendor Name or Invoice Number). See FIG. 5.

A4: The user is required to indicate on the image the location of the field. Typically this is done by one mouse click on a relevant area in the image which is displayed on the screen. In some preferred embodiments of the present invention it is possible to use a touch screen. Another possibility is to draw a region around the data instead of one click and skip the next step A5.

A5: An algorithm is applied to find the location of the text area near the location of the point of click and to extract the Text data.

One possible algorithm to do this is as follows:

A5.1) A standard OCR program runs on the full-page image, extracting the Text and the location of each word from the page;

A5.2) The word with the closest location to the location of the point of click is extracted.

A5.3) The program may decide which other words should be extracted according to the field type. See examples below:

A5.3.1) Date field: if the field is Date field then only the words or other characters that typically are used for indicating a date in a known date format, like "Dec. 27, 2004" or "Dec. 27, 2004" should be extracted.

A5.3.2) Amount field: if the field is Amount field (like price or total invoice) then the algorithm will take the closest word that is given in a known amount format, like "$199.95" or "199.95 USD".

A5.3.3) One word field: sometimes it is known that a field should contain only one word, like in the case of invoice number.

A5.3.4) Vendor/Customer name field: such field can be a combination of several words. To decide which words should be extracted, the algorithm calculates the average space between words in the whole document after the upper third and the lower third of the word distances are removed; then the algorithm takes all the words with a distance less than 1.5 times the average distance between words. Only words in the same line are considered to be extracted.

Figure 6:
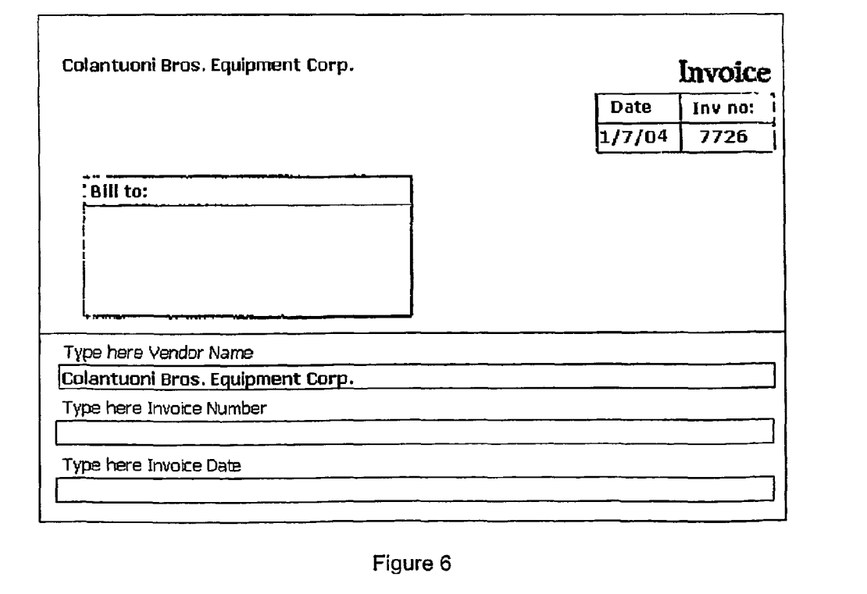
FIG. 6 illustrates the screen immediately after the user clicked on the Vendor data on the image, displaying and verifying extracted data by the user according to a preferred embodiment of the present invention.

A6: Optional steps are that the extracted data be post-processed to fix obvious OCR errors (examples: "1213112006" is fixed to "Dec. 31, 2006", "199.95 USD" is fixed to "199.95"), displayed and verified by the user. See FIG. 6.

A7: The extracted data is kept for further execution or sent immediately to the Target Application. The location of the field is stored in the Template as a Field Region which is an instruction for future field extraction. It can be stored in this stage or later, and it can be stored as complex instructions according to the content of the physical image and/or as coordinates. See above regarding the definition of Field Region. This is an important element of the invention: the customization work is not needed because the templates are created during the normal work of data entry.

Figure 7:
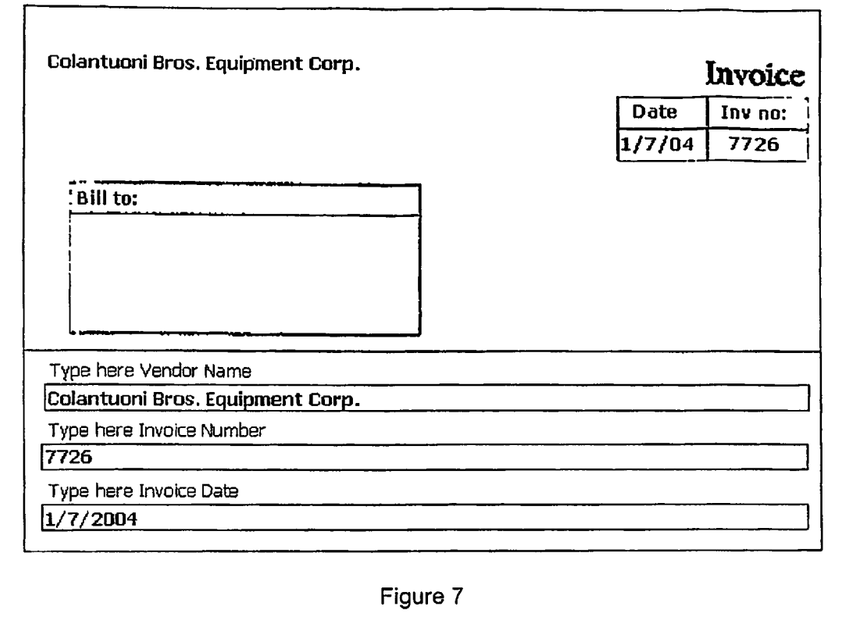
FIG. 7 shows a screen according to a preferred embodiment of the present invention, after all fields are processed.

A8: Steps A3-A7 are repeated and applied for the consecutive Logical Fields. FIG. 7 shows the screen after all fields are processed.

For fields that belong to a table the following steps (A9-A10) are applied:

A9: Steps A3-A7 are applied to each of the Logical Fields in the first line of the Table in the form (e.g.: catalog number, quantity, price, etc).

A10: Table Extraction (as described hereinabove) is performed to find the location data and extract that data of all other lines in the table.

A11: Continue with the next stage that sends the data of the fields into a Target Application. See stage C1 below.

B1: If the Template Matching Algorithm succeeds, then for each field the location of the field is calculated according to the Template instructions and the data is extracted using OCR. The content can be saved for further execution or sent immediately to the Target Application.

If there is a table to extract, then B2-B3 below are applied:

B2: The same step B1 is applied to the fields in the first table line. It is possible to skip this stage if the Table Extraction doesn't need to know the location of the physical fields in the first line, like in U.S. Pat. No. 5,737,442.

B3: Table Extraction is applied to find the location and the data of all other lines in the table.

B4: Continue with the next stage that sends the data of the fields into a Target Application. See stage C1 below.

We now describe one way of integrating the extracted data of one or more fields into a Target Application. According to a preferred embodiment of the present invention it works as follows:

C1. The user runs a Target Application simultaneously (in a separate window).

C2. The data that was collected in the previous steps is sent to the Target Application as keystrokes, mouse moves, touch screen strokes, or Windows messages that simulate mouse moves or keystrokes that the user makes in his usual way of data entry.

In this way the validation checks of the data and the data storage are carried out in the usual manner in which the Target Application works. The only difference is that some of the typing and mouse moves are not done by a real keyboard and a mouse. Instead of exhausting typing the data is transferred by simulating the keyboard.

The transfer of the extracted data to the Target Application can be done in other ways too. Furthermore it is anticipated that specific users would require specific customization of the data transfer to the Target Application. The present invention is aimed at providing form data extraction without customization to be transferred to the Target Application. The description on data transfer to a Target Application given here is merely an example.

The form processing method and system of the present invention has a strong appeal to the business market. The fact that no initial customization is needed in the form processing method and system of the present invention renders form processing a simple task. Small and medium businesses that would have otherwise would not consider automated form processing due to substantial costs involved in customization would find the present invention extremely beneficiary.

The method of the present invention can be supplemental to existing form-processing methods. For example, in form processing applications where the application is capable of extracting at least some of the information provided on a form, without previous knowledge of the form (such as Flexi-Capture™ by ABBYY), the method of the present invention can be used to extract the rest of the information that was not extracted using other methods.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A form processing method for extracting one or more data items from a filled form, the method comprising:
   prompting a user to operate a pointing device to indicate on a digital image of the filled form a location of a single point indicative of a location of a physical field that includes a data item of specific type of said one or more data items, a template not being available for the form;
   receiving the indicated location of the point;
   automatically identifying characters in the digital image that are included in the physical field, wherein automatically identifying the characters comprises identifying a word in the digital image that is closest to the indicated point; and
   extracting content of the data item from the indicated location of the physical field using a data format that is related to the specific type of that data item.

2. The method as claimed in claim 1, further comprising:
   using the indicated location of the physical field to establish a template comprising instructions where to find a data item of a specific type on forms with a layout which is similar to that of the filled form.

3. The method of claim 2, further comprising:
   matching another digital image of another form with the template; and
   upon determining a match automatically extracting data items using the template instructions.

4. The method as claimed in claim 1, wherein operating the pointing device comprises performing a single click by the pointing device on or in the vicinity of the data item in the image.

5. The method as claimed in claim 1, wherein operating the pointing device comprises touching a touch screen on which the image is displayed on or in the vicinity of the data item in the image.

6. The method as claimed in claim 1, further comprising transferring the data item to a target application.

7. The method as claimed in claim 1, wherein the image comprises a plurality of physical fields that are arranged in the form of a table.

8. The method as claimed in claim 7, wherein the step of receiving the indicated location comprises receiving indications from the pointing device on the location of items on a first row of the table, the method further comprising automatically extracting data items located in columns below the indicated items of the first row of the table.

9. The method as claimed in claim 8, further comprising:
using the locations of the data items of the first row of the table establishing a template comprising instructions where to find data items of same specific type in columns of the table in forms with a similar layout.

10. The method as claimed in claim 9, further comprising:
matching another digital image of another form with the template; and
upon determining a match automatically extracting data items from the table using the template instructions.

11. The method of claim 1, wherein automatically identifying the characters comprises comparing characters in the digital image with a format related to said specific type of that data item.

12. A form processing system comprising:
a display device for displaying the digital image;
a pointing device;
a processing unit configured to:
prompt a user to operate the pointing device to indicate on a digital image of a filled form for which a template is not available a single point that is indicative of a location of a physical field that includes a data item of specific type,
receive the indicated location of the point on the image displayed on the display device,
automatically identify characters in the digital image that are included in the physical field, wherein automatically identify the characters comprises identify a word in the digital image that is closest to the indicated point, and
extract content of the data item from the indicated location of the physical field using a data format that is related to the specific type of that data item.

13. The system as claimed in claim 12, wherein the display device and the pointing device are integrated in a touch screen display device.

14. The system of claim 12, wherein the processing unit is designed to establish a template comprising instructions where to find data items of specific types on forms with a layout which is similar to the filled form, using the indicated location of each of said one or more physical fields.

* * * * *